United States Patent
Cameron

(10) Patent No.: US 7,908,318 B2
(45) Date of Patent: *Mar. 15, 2011

(54) METHOD AND SYSTEM FOR THE PROTECTED STORAGE OF DOWNLOADED MEDIA CONTENT VIA A VIRTUALIZED PLATFORM

(75) Inventor: Donald F. Cameron, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/559,030

(22) Filed: Sep. 14, 2009

(65) Prior Publication Data

US 2010/0169461 A1 Jul. 1, 2010

Related U.S. Application Data

(63) Continuation of application No. 11/479,099, filed on Jun. 30, 2006, now Pat. No. 7,610,310.

(51) Int. Cl.
*G06F 17/30* (2006.01)
(52) U.S. Cl. .......................... 709/203; 707/831
(58) Field of Classification Search .................. 707/802, 707/831; 709/203
See application file for complete search history.

(56) References Cited

U.S. PATENT DOCUMENTS

| | | | |
|---|---|---|---|
| 6,574,609 B1 | 6/2003 | Downs et al. | |
| 7,469,346 B2 * | 12/2008 | Watson | 713/193 |
| 7,610,310 B2 * | 10/2009 | Cameron | 1/1 |
| 2005/0004873 A1 | 1/2005 | Pou et al. | |
| 2005/0102515 A1 | 5/2005 | Jaworski et al. | |
| 2005/0204126 A1 | 9/2005 | Watson | |
| 2007/0050766 A1 * | 3/2007 | Pomerantz | 718/1 |

FOREIGN PATENT DOCUMENTS

| | | |
|---|---|---|
| CN | 101479715 A | 7/2009 |
| DE | 112007001417 | 5/2009 |
| WO | 02/086803 A1 | 10/2002 |
| WO | 2008/005720 A1 | 1/2008 |

OTHER PUBLICATIONS

International Preliminary Report on Patentability received for PCT Application No. PCT/US2007/071951, mailed on Jan. 15, 2009, 8 Pages.
International Search Report and Written Opinion received for PCT Application No. PCT/US2007/071951, mailed on Nov. 19, 2007, 10 Pages.
Office Action received for U.S. Appl. No. 11/479,099, mailed on Jul. 10, 2008, 8 Pages.
Response to Office Action received for U.S. Appl. No. 11/479,099, filed on Nov. 10, 2008, 15 Pages.
Office Action received for U.S. Appl. No. 11/479,099, mailed on Jan. 26, 2009, 6 Pages.
Response to Office Action received for U.S. Appl. No. 11/479,099, filed on Apr. 27, 2009, 14 Pages.
Notice of Allowance received for U.S. Appl. No. 11/479,099, mailed on Jun. 15, 2009, 9 Pages.

* cited by examiner

*Primary Examiner* — Cheryl Lewis
(74) *Attorney, Agent, or Firm* — Garrett IP, LLC

(57) ABSTRACT

A method and system for the protected storage of downloaded media content via a virtualized platform. A method comprises downloading content to a special purpose virtual machine and then storing the downloaded content at a location, where the location is only accessible via the special purpose virtual machine. The stored content is then streamed over a virtual network to a general purpose virtual machine, where the special purpose virtual machine and the general purpose virtual machine exist on the same personal computer (PC).

16 Claims, 5 Drawing Sheets

METHOD AND SYSTEM FOR THE PROTECTED STORAGE OF DOWNLOADED MEDIA CONTENT VIA A VIRTUALIZED PLATFORM

This application is a continuation of prior application Ser. No. 11/479,099, filed Jun. 30, 2006.

BACKGROUND

The importance for the consumer electronic device industry to continuously strive to produce products that protect media content cannot be overstated. Currently, the owners of premium media content, such as movies, are hesitant to distribute the media content over the Internet to general purpose personal computers (PCs). One of the reasons for this hesitancy is the concern that PC end-users will redistribute the media content or otherwise violate the license terms of the media content. This is particularly true for media content that is downloaded into files. Unlike streaming, in which media content is discarded as it is played, downloaded files are stored in a file system where they are vulnerable to misuse. Content owners may use technology such as encryption and/or Digital Rights Management to address these concerns, but these schemes often are broken by determined hackers.

BRIEF DESCRIPTION OF THE DRAWINGS

The invention may be best understood by referring to the following description and accompanying drawings that are used to illustrate embodiments of the invention. In the drawings.

DESCRIPTION OF EMBODIMENTS

Figure 1:
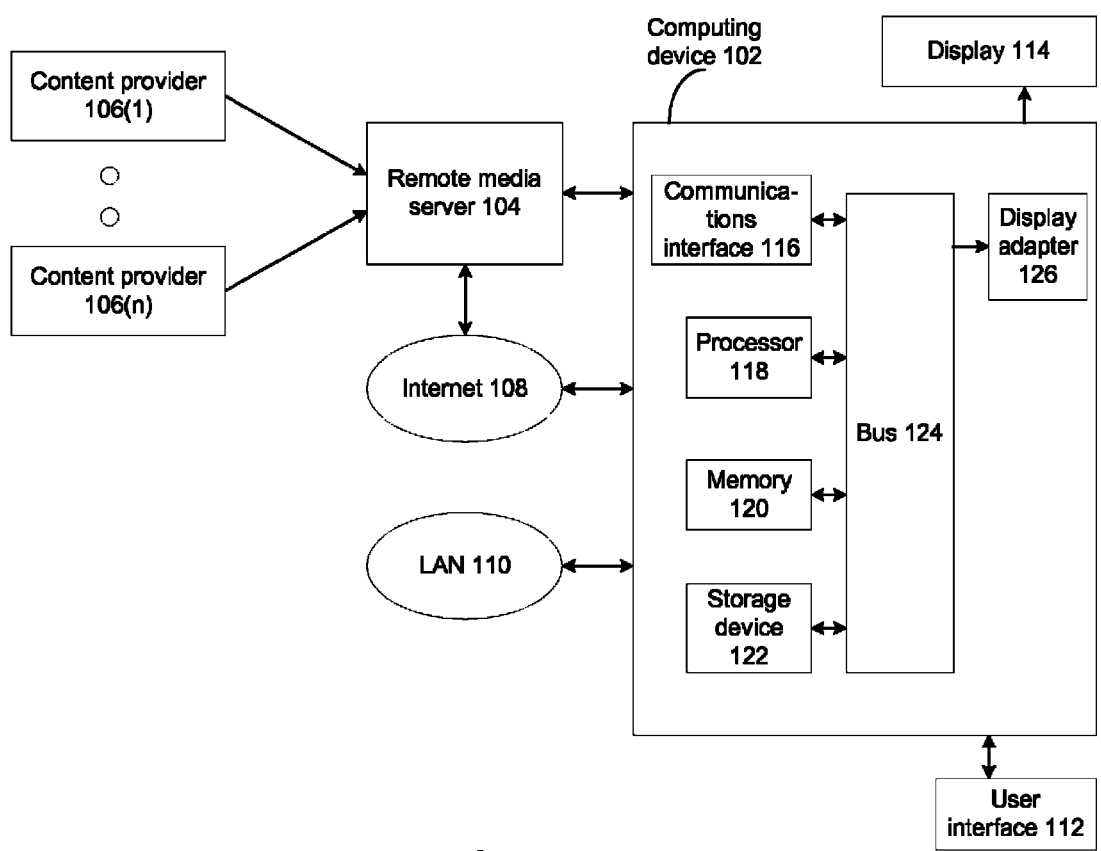
FIG. 1 illustrates an embodiment of an environment for the invention, in which some embodiments may operate.

According to an embodiment of the invention, a method and system for the protected storage of downloaded media content via a virtualized platform are described. The invention provides a secure, closed environment in which media content or files can be stored on a general purpose PC in such a way that the media content is not accessible to end-users. Here, users are prevented from redistributing media content and reduces the risk of hacking. In addition, since media content is kept in a controlled environment it is easier to enforce policies such as deletion after the license terms have expired.

In the following description, for purposes of explanation, numerous specific details are set forth. It will be apparent, however, to one skilled in the art that embodiments of the invention can be practiced without these specific details.

In the following detailed description of the embodiments, reference is made to the accompanying drawings that show, by way of illustration, specific embodiments in which the invention may be practiced. In the drawings, like numerals describe substantially similar components throughout the several views. These embodiments are described in sufficient detail to enable those skilled in the art to practice the invention. Other embodiments may be utilized and structural, logical, and electrical changes may be made without departing from the scope of the present invention.

Figure 2:
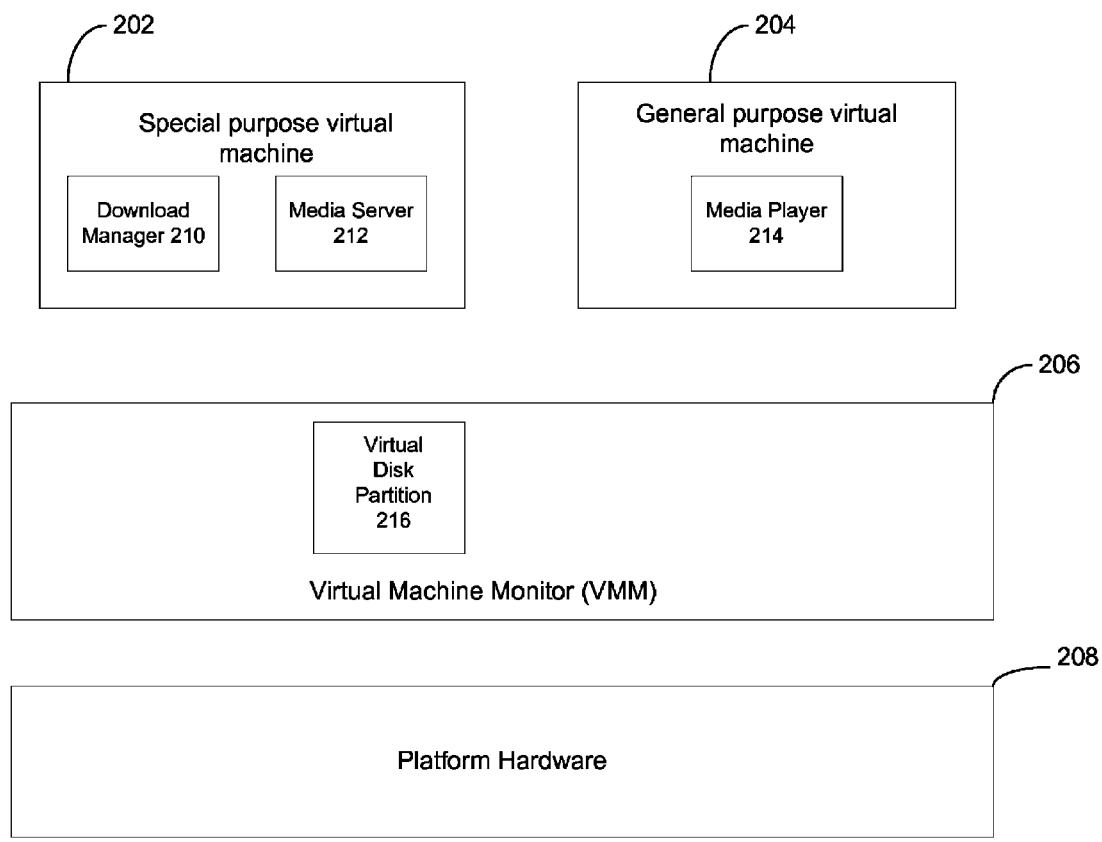
FIG. 2 illustrates an embodiment of an environment for the invention, in which some embodiments may operate.

FIGS. 1 and 2 each illustrate an embodiment of an environment for the invention, in which some embodiments may operate. The specific components shown in FIGS. 1 and 2 represent one example of a configuration that may be suitable for the invention and is not meant to limit the invention. Thus, other embodiments of the invention may include more or less components as described in each of FIGS. 1 and 2. For example, the functionality of two or more components of FIGS. 1 and 2 may be combined into one component. Likewise, the functionality of one component of FIG. 1 or 2 may be separated and performed by more than one component. Each component shown in FIG. 1 or 2 may be implemented as a hardware element, as a software element executed by a processor, as a silicon chip encoded to perform its functionality described herein, or any combination thereof.

The environments of each of FIGS. 1 and 2 may be implemented as a wired communication system, a wireless communication system, or a combination of both. Although the environment of each of FIGS. 1 and 2 may be illustrated using a particular communication medium by way of example, it may be appreciated that the principles and techniques discussed herein may be implemented using any type of communication media and accompanying technology. The embodiments are not limited in this context. Other communication systems may be added or substituted according to the particular application for the environment in FIGS. 1 and 2 and/or as new types of systems are developed.

Referring to FIG. 1, the environment may include, but is not necessarily limited to, a computing device 102, a remote media server 104, one or more content providers 106(1)-106(n), the Internet 108, a local area network (LAN) 110, a user interface 112 and a display 114. Computing device 102 may include, but is not necessarily limited to, a communications interface 116, a processor 118, memory 120, a storage device 122, a bus 124 and a display adapter 126. At a high level and in an embodiment of the invention, computing device 102 may receive and store content (e.g., media content) and related guide data for the content from remote media server 104, the Internet 108 and LAN 110. Computing device 102 may also receive input via user interface 112. The content and related guide data may be displayed on display 114.

In an embodiment of the invention, content may include, but is not necessarily limited to, shows or programs, voice, audio, music, graphics, video games, books, and so forth. In an embodiment of the invention, related guide data may include one or more of, but is not necessarily limited to, content name, channel or location (e.g., location on the Internet 108 via an Internet Protocol (IP) address or Uniform Resource Location (URL), location on a hard disk found in LAN 110, location on computing device 102 itself, etc.), type of content (e.g., broadcast, stream, download, etc.), metadata (e.g., content description, year of release, ratings information, category, etc.), air time, a brief synopsis, stars, and so forth. These examples are not meant to limit the invention. Each of the components of FIG. 1 is described next in more detail.

Computing device 102 may be any device adapted to include the functionality of the present invention. For example, device 102 may be a digital television, set-top box, a digital video recorder, a digital network recorder, a personal computer, a portable computer, a cellular telephone, a personal digital assistant (PDA), a computing tablet, or any other similar device. Although only one computing device 102 is depicted in FIG. 1, the invention may involve multiple computing devices 102.

In an embodiment of the invention, computing device 102 may include communications interface 116 that allows for the receipt of high-speed digital data such as a cable modem, DSL modem, Ethernet interface, satellite receiver, etc. Computing device 102 may also include a non-volatile storage device 122 for storing received digital data for later access. Such storage devices typically include magnetic media such as hard disk drives and may include other machine readable media such as optical disks, card and stick memory devices, flash memory devices, and the like.

In one embodiment, the invention is included in computing device 102 as software that is stored on storage device 122 or other machine readable medium and is executed by processor 118 which utilizes memory 120. Processor 118 may be any processor, and memory 120 may be any kind of random access memory (RAM) or other form of memory.

Computing device 102 may process received content and related guide data (e.g., download and store) and sends a resulting signal via display adapter 126 to display 114 to be presented to a viewer. Communications interface 116, processor 118, memory 120, storage device 122 and display adapter 126 are, in one embodiment, coupled to bus 124. In various embodiments, computing device 102 may include multiple communications interfaces, processors, storage devices, display adapters and buses, as well as other components not shown in FIG. 1. In various embodiments, computing device 102 may include an audio processor and/or game processor or game interface, one or more digital tuners, one or more analog tuners, and so forth.

In an embodiment of the invention, computing device 102 may receive content and related guide data from remote media server 104, the Internet 108 and LAN 110. This may be a straight download of all content and related guide data or may be a query to limit the amount of information received by computing device 102. Remote media server 104 may receive data from at least one content provider 106 and forwards digital data to computing device 102. Content providers 106 may be a server computer or a group, subnetwork, LAN or other group of multiple computers, that provide data to remote media server 404.

The Internet 108 may be used by computing device 102 for streamed content and related guide data (such as via subscription services) and for downloadable content and related guide data (such as video/audio from an Internet-based store that allows a user to purchase video/audio). LAN 110 may be a household, office, or store media server or personal computers that contain content, such as, for example, television programs, photographs and audio files.

In embodiments of the invention, connections between content providers 106, remote media server 104, the Internet 108, LAN 110 and computing device 102 may be one or more of T1 lines, T3 lines, coaxial cable, Ethernet, twisted-pair, fiber optics such as a Synchronous Optical Network (SONET), digital television (DTV), cable television (CATV), microwave, satellite, radio waves, or any combination of wired/wireless communications.

In an embodiment of the invention, remote media server 104, the Internet 108 and LAN 110 may receive content as digital data or analog data. If analog data is received, it may be converted into an appropriate digital format before being forwarded to computing device 102. When content is received as analog data, it may be any well-known or proprietary analog format, such as the National Television System Committee (NTSC) format.

The format of the content sent to computer device 102 may be any digital data format, including, for example, data interchange formats such as Internet Protocol (IP) Packets and File Transfer Protocol (FTP) packets; combined audio and moving video formats such as the formats promulgated by the International Telecommunications Union (ITU), the Advanced Television Systems Committee (ATSC), and similar organizations such as High Definition Television (HDTV) and Moving Pictures Expert Group (MPEG); related audio formats; still video formats such as Joint Photographic Experts Group (JPEG) format, Graphic Interchange Format (GIF); and so forth.

Display 114 may be external to computing device 102 or may be incorporated into device 102. Display 114 may be a cathode ray tube (CRT) display monitor, a thin film transistor (TFT) display screen, a liquid crystal display (LCD), or any display device suitable for displaying graphics and images.

User interface 112 may be any device capable of allowing one or more viewers to interface with computing device 102. User interface 112 may be external to computing device 102 or may be incorporated into device 102. For example, user interface 112 may be utilized by one or more viewers to log into computing device 102, to view content and/or related guide data, and so forth. In embodiments of the invention, user interface 112 may be implemented as a remote control, a PDA, a touch screen or button(s) on the display 114 or computing device 102, a joystick, a keyboard, a game pad, a personal computer, a laptop computer, a cellular phone, and so forth. These examples are provided for illustration purposes only and are not meant to limit the invention.

FIG. 2 illustrates an embodiment of an environment for the invention, in which some embodiments may operate. In FIG. 2, the invention is implemented via an embodiment of a virtualized platform. In general, a virtualized platform is a single physical platform that is segregated into a plurality of virtual machines. The physical platform incorporates at least one virtual machine monitor (VMM). A conventional VMM typically runs on a computer and presents to other software the abstraction of one or more virtual machines. Each virtual machine may function as a self-contained platform, running its own "guest operating system" (i.e., an operating system (OS) hosted by the VMM) and other software, collectively referred to as guest software.

Processes running within a virtual machine are provided with an abstraction of some hardware resources and may be unaware of other virtual machines within the system. A hypervisor provides the virtualization abstraction of computer systems underneath it. Every virtual machine assumes that it has full control over the hardware resources allocated to it. The VMM is an entity that is responsible for appropriately managing and arbitrating system resources among the virtual machines including, but not limited to, processors, input/out (I/O) devices and memory.

In the embodiment described herein in relation to FIG. 2, a virtualized platform is utilized for the protected storage of downloaded media content. Implementing the invention via a virtualized platform provides a secure, closed environment in which media content or files can be stored on a general purpose PC in such a way that the media content is not accessible to end-users, and thus helps to prevent unauthorized redistribution of the downloaded media content. Although the embodiment in FIG. 2 is described with reference to a virtualized platform and downloaded media content, the present invention is not limited in this regard and is applicable to any secure, closed environment and/or any type of content.

Referring to FIG. 2, the environment includes, but is not necessarily limited to, a closed special purpose virtual machine 202, a general purpose virtual machine 204, a VMM 206 and platform hardware 208. Though two virtual machines are shown in FIG. 2, it is understood that any number of virtual machines may be present in environment. Each of these components is described next in more detail.

Special purpose virtual machine 202 may include, but is not necessarily limited to, a download manager 210 and a virtual media server 212. Download manager 210 and virtual media server 212 are executing in a closed special purpose operating system of virtual machine 202. General purpose virtual machine 204 may include, but is not necessarily limited to, a media player 214. Media player 214 is operating in a general purpose operating system of virtual machine 204 and facilitates a user to view the media content. VMM 304 may include, but is not limited to, a virtual disk partition 216. Virtual disk partition 216 is accessible only to special purpose virtual machine 202. Platform hardware 208 can be of a personal computer (PC), digital television, mainframe, handheld device, portable computer, set-top box, or any other computing system, that is adapted to perform the functionality of the invention. In an embodiment of the invention, platform hardware 208 is similar to what was described above with reference to FIG. 1.

Figure 3:
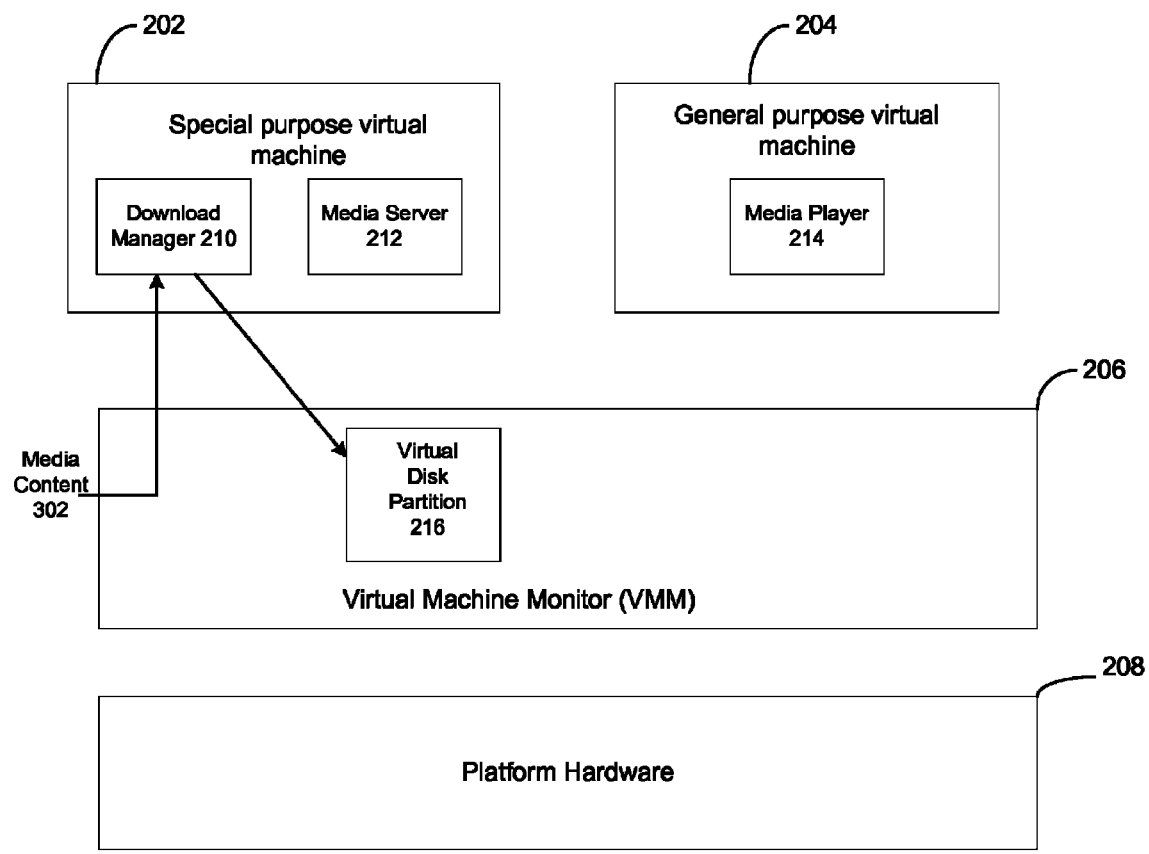
FIG. 3 illustrates downloading media content into a special purpose virtual machine, according to an embodiment of the invention.

In an embodiment of the invention, special purpose virtual machine 202 and general purpose virtual machine exist on the same general purpose PC. As illustrated in FIG. 3, media content 302 is downloaded by download manager 210 of special purpose virtual machine 202. As described above with reference to FIG. 1, media content 302 may be sent via one or more of remote media server 104, the Internet 108 and LAN 110. The downloaded media content is then stored in virtual disk partition 216 of VMM 206. Virtual disk partition 216 is accessible only to special purpose virtual machine 202. Download manager 210 may use a traditional client/server scheme, a peer-to-peer scheme, and so forth, to download the media content. These download schemes are provided for illustration purposes only and are not meant to limit the invention.

Figure 4:
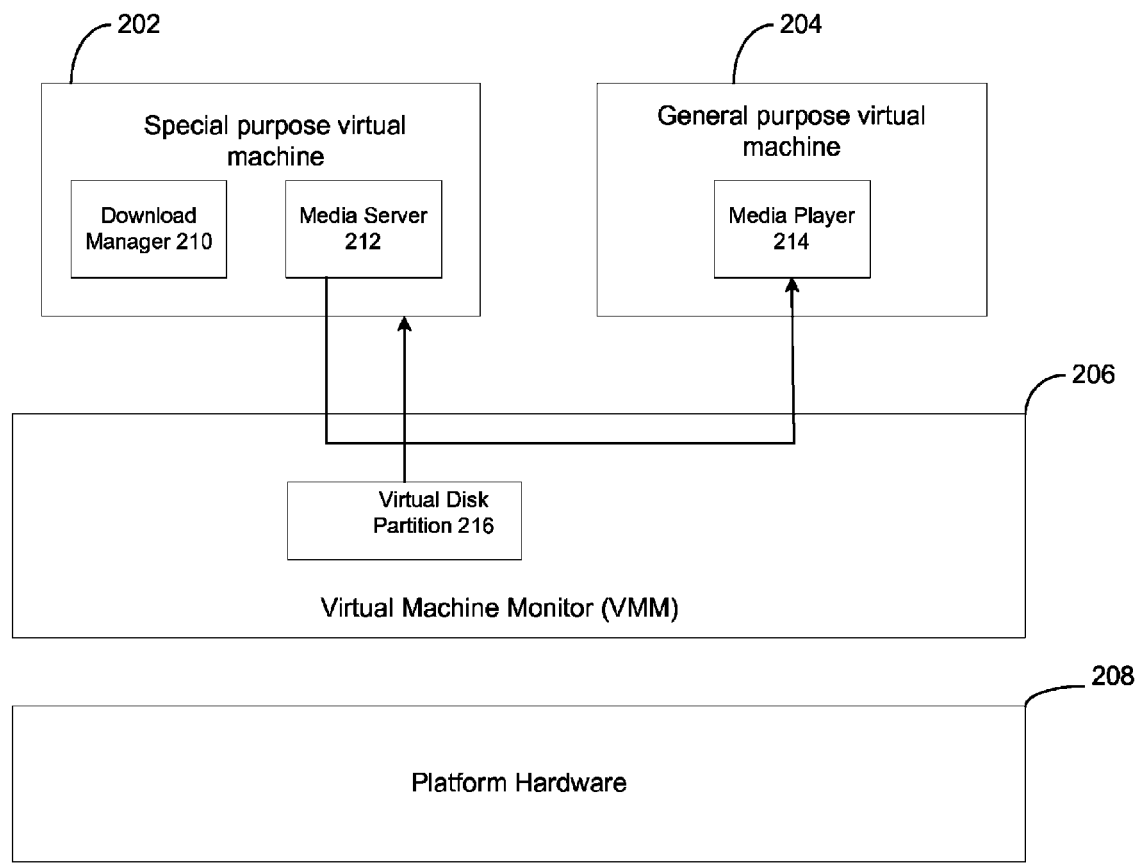
FIG. 4 illustrates streaming media content between a special purpose virtual machine and a general purpose virtual machine, according to an embodiment of the invention.

In an embodiment of the invention and as illustrated in FIG. 4, virtual media server 212 of special purpose virtual machine 202 accesses the stored media content in virtual disk partition 216 and streams it over a virtual network connection to media player 214 of general purpose virtual machine 204. Since streaming is used to move the media content between special purpose virtual machine 202 and general purpose machine 204 existing on the same general purpose PC, the media content never exists in the general purpose operating system's file system and thus is not accessible by applications other than media player 204. In addition, since the streaming is between two virtual machines existing on the same general purpose PC, the operation of streaming the media content does not suffer from the latency, quality of service, or bandwidth limitations that occur when content is streamed across the Internet, for example.

As mentioned above and in an embodiment of the invention, virtual disk partition 216 is accessible only to special purpose virtual machine 202. There are various ways in which the content of virtual disk partition 216 may be protected from disk utilities, hackers, being "spied on" by rouge software, and so forth. One way to protect the content of virtual disk partition 216 is to encrypt the content and metadata in a manner such that it is only accessible via an encryption key or similar mechanism. The encryption key would only be known by the special purpose operating system or other software running on virtual machine 202. Software or programs running in a closed environment, such as would exist on special purpose virtual machine 202, are better able to use an encryption key or similar mechanism without being "spied on" by rouge software. In a software implementation, the security mechanism could be upgraded and the license to view compromised content could be revoked. Another possible way to protect the content of virtual disk partition 216 is to use a disk hardware security mechanism that would protect individual partitions. These examples are provided for illustration purposes only and are not meant to limit the invention.

Embodiments of the operation of the present invention are described next with reference to FIG. 5. The flow diagram and other descriptions of processes herein are not intended to imply a fixed order of performing the process stages. Rather, the process stages may be performed in any order that is practicable.

Figure 5:
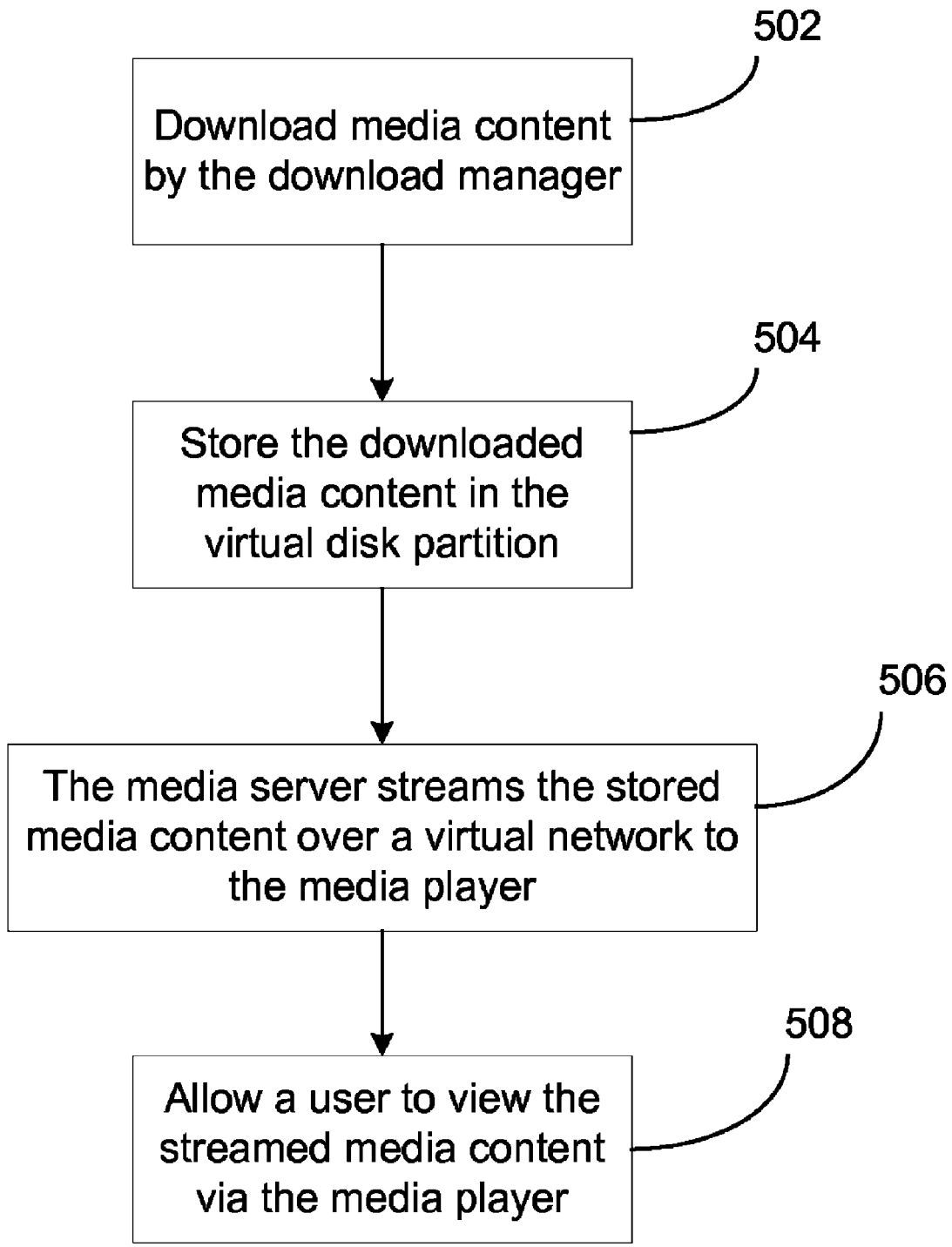
FIG. 5 is a flow diagram of one embodiment of a process for the operation of the protected storage of downloaded media content via a virtualized platform, in which some embodiments of the invention may operate.

FIG. 5 is a flow diagram of one embodiment of a process for the operation of the protected storage of downloaded media content via a virtualized platform, in which some embodiments of the invention may operate. Referring to FIG. 5, the process begins at block 502 where media content is downloaded by a download manager operating on a closed system (such as download manager 210 of special purpose virtual machine 202 of FIG. 2). The downloaded media content is then stored in a virtual disk partition (such as virtual disk partition 216 of VMM 206 of FIG. 2), at block 504. A media server operating on the closed system (such as virtual media server 212 of special purpose virtual machine 202 of FIG. 2) accesses the stored media content in the virtual disk partition and streams it over a virtual network connection to a media player operating in a general system (such as media player 214 of general purpose virtual machine 204 of FIG. 2), at block 506. The media player allows a user to view the media content, at block 508.

Embodiments of the present invention may be implemented in software, firmware, hardware or by any combination of various techniques. For example, in some embodiments, the present invention may be provided as a computer program product or software which may include a machine or computer-readable medium having stored thereon instructions which may be used to program a computer (or other electronic devices) to perform a process according to the present invention. In other embodiments, steps of the present invention might be performed by specific hardware components that contain hardwired logic for performing the steps, or by any combination of programmed computer components and custom hardware components.

Thus, a machine-readable medium may include any mechanism for storing or transmitting information in a form readable by a machine (e.g., a computer). These mechanisms include, but are not limited to, a hard disk, floppy diskettes, optical disks, Compact Disc-Read-Only Memory (CD-ROMs), magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, a transmission over the Internet, electrical, optical, acoustical or other forms of propagated signals (e.g., carrier waves, infrared signals, digital signals, etc.) or the like.

Some portions of the detailed descriptions above are presented in terms of algorithms and symbolic representations of operations on data bits within a computer system's registers or memory. These algorithmic descriptions and representations are the means used by those skilled in the data processing arts to convey the substance of their work to others skilled in the art most effectively. An algorithm is here, and generally, conceived to be a self-consistent sequence of operations leading to a desired result. The operations are those requiring physical manipulations of physical quantities. Usually, although not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussions, it is appreciated that discussions utilizing terms such as "processing" or "computing" or "calculating" or "determining" or the like, may refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Reference throughout this specification to "one embodiment" or "an embodiment" means that a particular feature, structure, or characteristic described in connection with the embodiment is included in at least one embodiment of the invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
    downloading content to a special purpose virtual machine;
    storing the downloaded content at a location, wherein the location is only accessible via the special purpose virtual machine; and
    making the stored content available for streaming from the special purpose virtual machine over a virtual network to a general purpose virtual machine, wherein the special purpose virtual machine and the general purpose virtual machine exist on the same computer, wherein the content to be downloaded is received from one or more of a remote media server, the Internet and a local area network (LAN).

2. The method of claim 1, wherein the stored content available for streaming is only accessible via an application running on the general purpose virtual machine.

3. The method of claim 2, wherein the application allows a user to view the content.

4. The method of claim 3, wherein the application comprises a media player.

5. The method of claim 1, wherein the location comprises a virtual disk partition that exists on the same computer as the special purpose virtual machine and the general purpose virtual machine.

6. The method of claim 5, wherein the stored content on the virtual disk partition is encrypted and can only be decrypted via a mechanism known only to the special purpose virtual machine.

7. A system comprising:
    a closed virtual machine; and
    an application configured to execute on a general purpose virtual machine, wherein the closed virtual machine and the general purpose virtual machine exist on the same computer,
    wherein the closed virtual machine comprises a download manager and a server, the download manager configured to download content and to store the downloaded content at a location, wherein the location is only accessible via the closed virtual machine, and the server is configured to make available the stored content for streaming from the closed virtual machine over a virtual network to the application, wherein the content to be downloaded is received from one or more of a remote media server, the Internet and a local area network (LAN).

8. The system of claim 7, wherein the content is only accessible via the application.

9. The system of claim 7, wherein the application comprises a media player.

10. The system of claim 7, wherein the location comprises a virtual disk partition that exists on the same computer as the closed virtual machine and the general purpose virtual machine.

11. The system of claim 10, wherein the stored content on the virtual disk partition is encrypted and can only be decrypted via a mechanism known only to the closed virtual machine.

12. A computer-readable non-transitory medium containing instructions which, when executed by a processing system, cause the processing system to perform a method, the method comprising:
    downloading content to a special purpose virtual machine;
    storing the downloaded content at a location, wherein the location is only accessible via the special purpose virtual machine; and
    making the stored content available for streaming from the special purpose virtual machine over a virtual network to a general purpose virtual machine, wherein the special purpose virtual machine and the general purpose virtual machine exist on the same computer, wherein the content to be downloaded is received from one or more of a remote media server, the Internet and a local area network (LAN).

13. The computer-readable medium of claim 12, wherein streaming the stored content over a virtual network to a general purpose virtual machine includes streaming the stored content to an application running on the general purpose virtual machine, wherein the streamed content is only accessible via the application.

14. The computer-readable medium of claim 12, wherein the application comprises a media player.

15. The computer-readable medium of claim 12, wherein the location comprises a virtual disk partition that exists on the same computer as the special purpose virtual machine and the general purpose virtual machine.

16. The computer-readable medium of claim 12, wherein the stored content on the virtual disk partition is encrypted and can only be decrypted via a mechanism known only to the special purpose virtual machine.

* * * * *